(12) United States Patent
Seo et al.

(10) Patent No.: US 7,751,352 B2
(45) Date of Patent: Jul. 6, 2010

(54) CONTROL SIGNAL TRANSMITTING METHOD IN MULTI-ANTENNA SYSTEM

(75) Inventors: Dong-Youn Seo, Anyang-shi (KR); Bong-Hoe Kim, Anyang-shi (KR); Joon-Kui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 356 days.

(21) Appl. No.: 10/939,965

(22) Filed: Sep. 14, 2004

(65) Prior Publication Data
US 2005/0128965 A1 Jun. 16, 2005

(30) Foreign Application Priority Data
Dec. 11, 2003 (KR) ............ 10-2003-0090272

(51) Int. Cl.
*H04B 7/00* (2006.01)
(52) U.S. Cl. ............... 370/310; 370/208
(58) Field of Classification Search .......... 370/310, 370/208
See application file for complete search history.

(56) References Cited

U.S. PATENT DOCUMENTS

| | | | |
|---|---|---|---|
| 6,473,467 B1 | 10/2002 | Wallace et al. | 375/267 |
| 6,985,466 B1 * | 1/2006 | Yun et al. | 370/335 |
| 7,006,464 B1 * | 2/2006 | Gopalakrishnan et al. | 370/328 |
| 7,536,198 B1 * | 5/2009 | Wu et al. | 455/522 |
| 2003/0123470 A1 | 7/2003 | Kim et al. | 370/437 |
| 2003/0189918 A1 | 10/2003 | Das et al. | 370/349 |
| 2004/0082356 A1 * | 4/2004 | Walton et al. | 455/522 |
| 2004/0196919 A1 * | 10/2004 | Mehta et al. | 375/267 |
| 2006/0092886 A1 * | 5/2006 | Tsunehara et al. | 370/335 |

FOREIGN PATENT DOCUMENTS

| | | |
|---|---|---|
| JP | 2003-530010 A | 10/2003 |
| JP | 2003-318781 A | 11/2003 |
| WO | WO 03/058871 A1 | 7/2003 |

OTHER PUBLICATIONS

International Search Report dated Mar. 14, 2005.
Japanese Office Action dated Nov. 26, 2008.

\* cited by examiner

*Primary Examiner*—Charles N Appiah
*Assistant Examiner*—Jaime M Holliday
(74) *Attorney, Agent, or Firm*—KED & Associates, LLP

(57) ABSTRACT

A method of communication in a Multiple Input Multiple Output (MIMO) system having multiple transmitters including transmitting independent parallel downlink control signals including control information for each data stream, and transmitting the data streams.

15 Claims, 4 Drawing Sheets

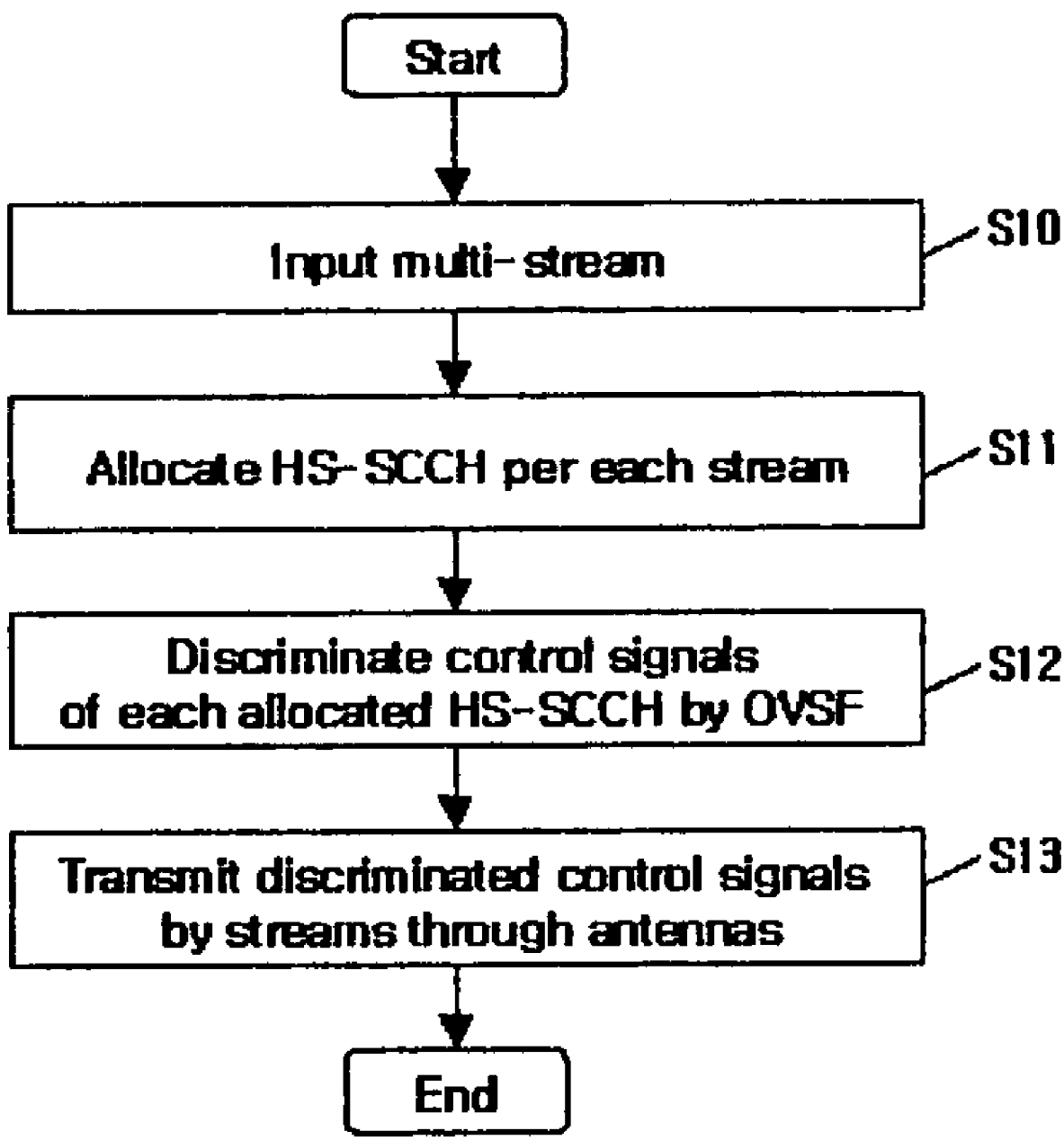

CONTROL SIGNAL TRANSMITTING METHOD IN MULTI-ANTENNA SYSTEM

CROSS-REFERENCE TO RELATED APPLICATIONS

This application claims the benefit of the Korean Application No. 090272/2003 filed on Dec. 11, 2003, which is hereby incorporated by reference. The present invention is also related to U.S. application Ser. Nos. 10/845,086 filed on May 14, 2004, Ser. No. 10/834,210, filed on Apr. 29, 2004, all of which are hereby incorporated in their entirety.

BACKGROUND OF THE INVENTION

1. Field of the Invention

The present invention relates to a mobile communication system, and more particularly to a method for transmitting a download control signal in a mobile communication system using multiple antennas.

2. Discussion of the Background Art

The rapid growth in mobile wireless communication systems now includes requests for multimedia services, which requires an increase in a data transmission capacity and a faster data rate. A High Speed Downlink Packet Access (HS-DPA) system is currently used to provide multimedia services and is designed to provide high-speed data transfer. See, for example, JUHUA KORHONEN, INTRODUCTION TO 3G MOBILE COMMUNICATIONS SYSTEMS ($2^{nd}$ ed. 2003), the entire contents of which are hereby incorporated by reference in its entirety. In the above-described communication systems, a base station is referred to as a Node B, and a mobile terminal, subscriber equipment, etc. is referred to as a User Equipment (UE).

However, the current HS-DPA system use a single antenna and is unable to meet the increasing demands for higher and higher data transfer speeds.

SUMMARY OF THE INVENTION

Accordingly, one object of the present invention is to address at least the above and other noted problems.

Another object of the present invention is to provide a method for discriminating channels through which control signals for separate data streams are transmitted.

To achieve at least the above objects in whole or in parts, the present invention provides a novel method of communication in a Multiple Input Multiple Output (MIMO) system having multiple transmitters. The method includes transmitting independent parallel downlink control signals including control information for each data stream, and transmitting the data streams.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 4 is a flow chart of a control signal transmitting method of a multi-antenna system according to the present invention.

BEST MODE OF THE INVENTION

Figure 1:
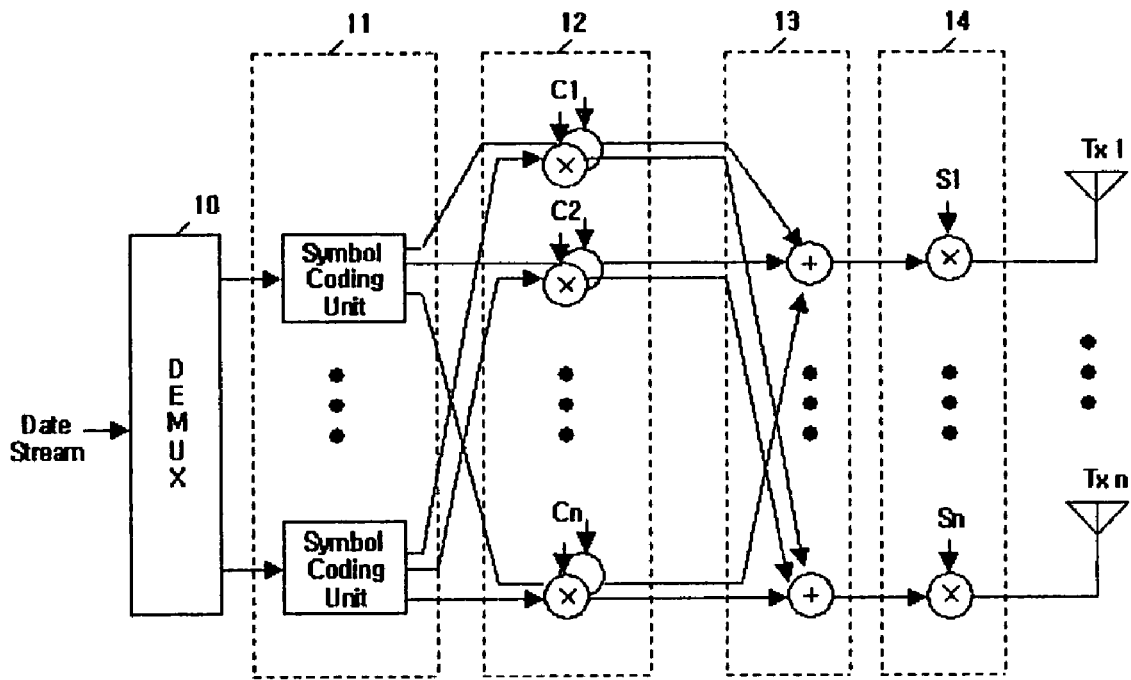
FIG. 1 is an overview illustrating a transmitting end of a Multiple-Input Multiple-Output (MIMO) system.

Referring now to the drawings, wherein like reference numerals designate identical or corresponding parts throughout the several view, the present invention will be described.

The present invention provides in one example a novel method for transmitting data at very high data rates using a MIMO system in, for example, a HS-DPA system. The MIMO system includes a plurality of transmitting antennas and a plurality of receiving antennas. Further, in the MIMO system, control information such as a modulation method, a code rate, the number of OVSF (Orthogonal Variable Spread Factor) codes, and an error re-transmission scheme can be set differently for each transmission stream. To accomplish this, the transmitting end of the MIMO system according to the present invention transmits control signals for the plurality of transmission streams to inform the receiving end of the MIMO system about the control information used in the transmitting end.

In more detail, FIG. 1 is an overview illustrating an example of a transmitting end of the MIMO system. As shown, the transmitting end includes a demultiplexer 10, a symbol coding unit 11, a channelization coding unit 12, a symbol combining unit 13, a scrambling unit 14, and transmitting antennas Tx1 to Txn.

In this example, the demultiplexer 10 branches a data stream to the plurality of transmission antennas Tx1 to Txn, and the symbol coding unit 11 sequentially performs channel coding, interleaving and mapping operations to generate a symbol, and then multiplexes the generated symbol.

Further, the channelization coding unit 12 allocates channelization codes C1~Cn to the plurality of symbols output from the symbol coding unit 11. The channelization code-allocated symbols are then combined in the symbol combining unit 13, spread in the scrambling unit 14 and then transferred to the plurality of transmission antennas Tx1~Txn.

Assume, for example, that a data stream input to the demultipexer 10 includes 1920 bits. The demultiplexer 10 then segments the input data stream into two data blocks including 960 bits each, for example. The two 960 data bits are then processed by the symbol combining unit 11 to perform coding, interleaving and mapping. In more detail, each of the 960 bits is coded based on the coding scheme for that particular antenna (assume a turbo coding of ½ is used for the first antenna Tx1 and a turbo coding of ⅓ is used for the antenna Txn). Thus, in this example, the first 960 bits would be coded into 1920 bits (i.e., a turbo coding of ½) and the Txn 960 bits would be coded into 2880 bits (i.e., a turbo coding of ⅓). The two coded blocks of data are then stored into an interleaver for mapping. Assume Quadrature Amplitude Modulation (QAM) is used for the antenna Tx1 and Quadrature Phase Shift Keying (QPSK) is used for the antenna Txn. Then, the first 1920 coded bits will be mapped into 480 symbols (i.e., 16QAM maps 4 bits to one symbol and thus 1920 coded bits will be mapped into 480 symbols). The Txn 2880 bits will be mapped into 1440 symbols (i.e., QPSK maps 2 bits into one symbol and thus 2880 coded bits will be mapped into 1440 symbols). The two separate coded and modulated data blocks are then processed by the channelization coding unit 12. In the current HS-DPA, a frame includes 3 slots and the spreading factor is fixed to 16. Then, the number of symbols per frame with one code is 480 symbols. Therefore, the first 480 symbols are transmitted with a one code and the second 1440 symbols are transmitted with 3 multicodes.

Figure 2:
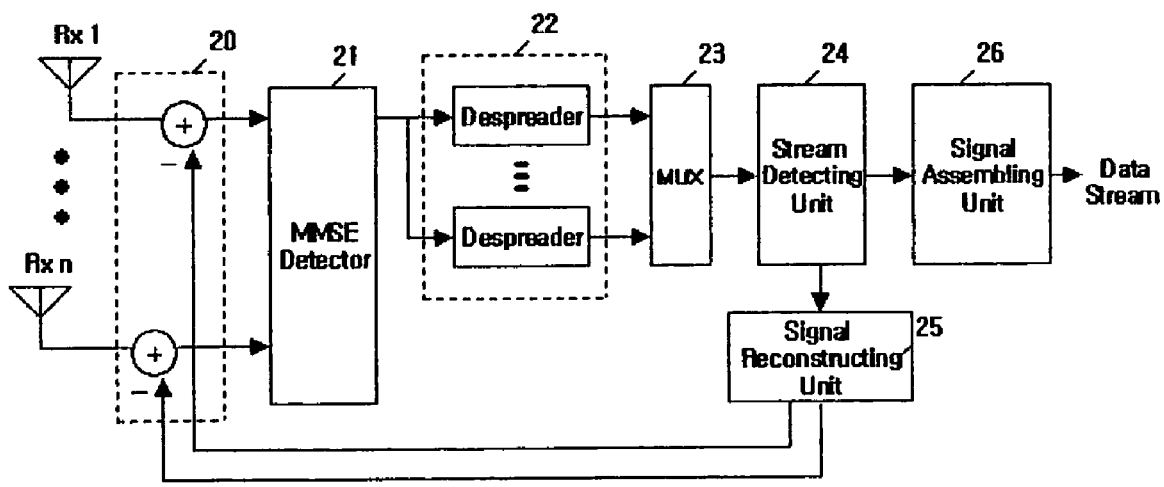
FIG. 2 is an overview illustrating a receiving end of the MIMO system.

The channelization coding unit 12 uses a variety of spreading codes such as OVSF (Orthogonal Variable Spreading Factor) codes to spread the data blocks so as to discriminate between different channels of each antenna. Further, the receiving side shown in FIG. 2 of the MIMO system has the same spreading codes and despreads the received data using the same codes. Thus, the MIMO system is able to select a different MCS Modulation Code Set) for each respective antenna to thereby increase the throughput of the system.

The spread symbols are then combined in the symbol combining unit 13 and scrambled in the scrambling unit 14 prior to being transmitted from the respective antennas Tx1 and Txn. Note the scrambling codes are used to discriminate cell regions (e.g., the received information is being received from Node B A rather than Node B B, for example).

The receiving operation reverses the transmitting operation to finally obtain the initially transmitted data. In more detail, with reference to FIG. 2, the receiving side includes an Minimum Mean-squared Error (MMSE) detector 21, a despreading unit 22, a multiplexer (MUX) 23, a stream detecting unit 24, a signal re-constructing unit 25 and a signal assembling unit 26.

Also included is an interference signal removing unit 20 that deletes a sub-stream (interference signal), which has been reconstructed in the stream detecting unit 24 from a receiving signal by using a plurality of buffers. Further, the MMSE detector 21 detects a signal having the greatest Signal-to-Interference Noise Ratio (SINR) among the interference-removed receiving signals and performs a MMSE linear conversion on the signal. An output of the MMSE detector 21 is despread in the dispreading unit 22 and then multiplexed in the multiplexer 23.

Further, the stream detecting unit 24 detects a transmission symbol from a signal outputted from the multiplexer 23 and performs de-mapping and de-interleaving operations on the detected symbol to detect a first sub-stream. Then, the signal reconstructing unit 25 reconstructs the first sub-stream detected by the stream detecting unit 24 into a receiving signal form and outputs it to the interference removing unit 20. To minimize mutual influence between symbols, the interference removing unit 20 deletes a first detected signal component (reconstructed signal) from the receiving signal previously stored in the buffer and then the signal component-detected signal to the MMSE detector 21.

Then, the MMSE detector 21 MMSE-linear-converts the signal having the greatest SINR among the reconstructed signal-removed signals. An output of the MMSE detector 20 is input to the stream detecting unit 24 through the despreader 22 and the multiplexer 23, and the stream detecting unit 24 detects a second sub-stream.

The signal reconstructing unit 25 then reconstructs the second sub-stream, which has been detected by the stream detecting unit 24, and outputs it to the reference removing unit 20. Then, the interference removing unit 20 deletes the reconstructed signal from a signal previously stored in the buffer and outputs it to the MMSE detector 20.

Thereafter, by repeatedly performing the above-described operations, the stream detecting unit 24 sequentially detects sub-streams. After all of the sub-streams are detected by the stream detecting unit 24, the signal assembling unit 26 assembles the plurality of detected sub-streams to form one data stream.

Thus, in the MIMO system, to transfer sequentially generated data independently through each transmission antenna, vector encoding is performed on each transmission data. Namely, the sequentially generated data passes through serial-parallel circuits (demultiplexer and symbol coding units) so that each antenna can transfer the data in parallel.

In addition, because the quality of channels of each transmission antenna is potentially different, the Modulation and Coding Set (MCS) and the number of OVSF codes can be set differently for each antenna. In other words, the transmitting end can determine the channel states of the different antennas by receiving channel quality information from the receiving end. Based on the received channel quality information, the base station (transmitting end) applies a QAM (Quadrature Amplitude Modulation) scheme or many OVSF codes, for example, to transmit data of a high code rate through the transmission antenna having a good channel state, and applies a QPSK (Quadrature Phase Shift Keying) or a small number of OVSF codes, for example, to transmit data of a low code rate.

In addition, as noted above, when the mobile terminal detects a signal transmitted from a specific transmission antenna, the terminal treats a signal transmitted from a different transmission antenna as an interference signal and detects the signals having the largest SINR first as being transmitted from each transmission antenna (namely, in the order of the magnitude of the SINR). For this purpose, the terminal calculates each weight vector of reception antennas for the signal transmitted from each transmission antenna and at the same time uses an SIC (Successive Interference Cancellation) method to remove an influence of the first detected signal.

Because the base station sets different MCS schemes and the number of OVSF codes used for each transmission antenna based on a downlink channel state, the present invention also advantageously provides downlink control information corresponding to each differently set MCS scheme, OVSF codes, retransmission schemes etc. That is, control information about each separate data stream is transmitted to the terminal.

In more detail, according to the present invention, the base station allocates a plurality of High-Speed Shared Control Channels (HS-SCCH), for example, to each HSDPA user, and each user (e.g., terminal, UE, subscriber unit etc.) simultaneously monitors four HS-SCCHs, for example. Thereafter, if data transmission to a user is required, the base station adds a UE ID into one of the allocated HS-SCCHs and transmits a control signal on the allocated HS-SCCH so that the terminal can recognize the HS-SCCH is for it.

As noted above, the MIMO system according to the present invention is able to set differently the MCS scheme, the number of OVSF codes used, the retransmission scheme to be used etc. This can be achieved using a Per Antenna Rate Control (PARC) method or using a Per Stream Rate Control (PSRC) method, which is a generalized concept of the PARC.

Figure 3A:
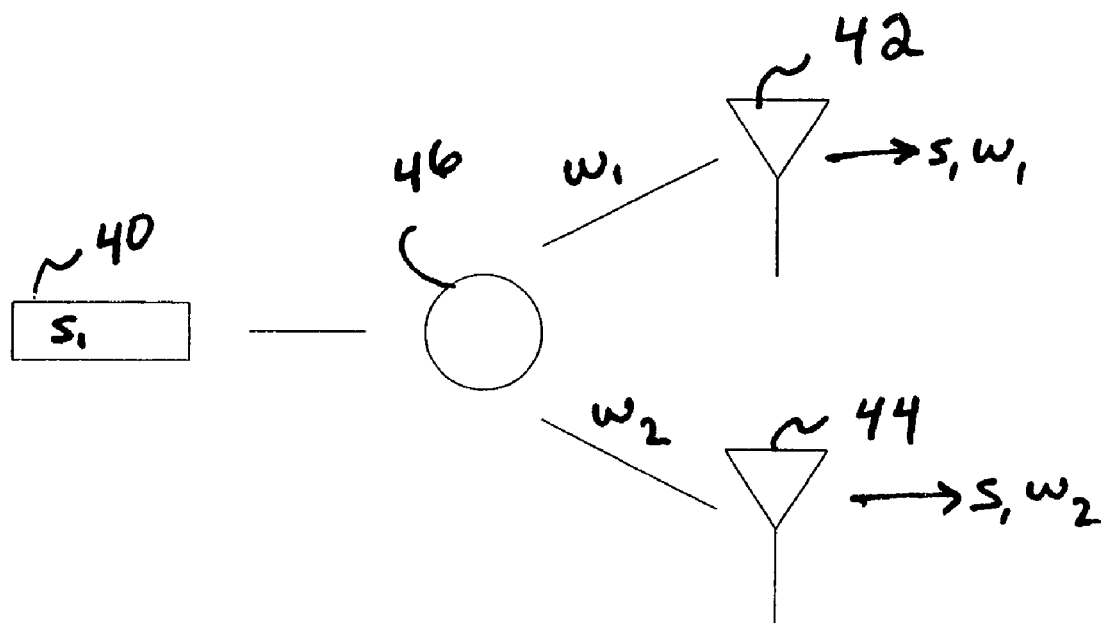
FIGS. 3A and 3B are an overview of transmitting antennas using a Per Stream Rate Control (PSRC) method and a Per Antenna Rate Control (PARC) method, respectively.
Figure 3B:
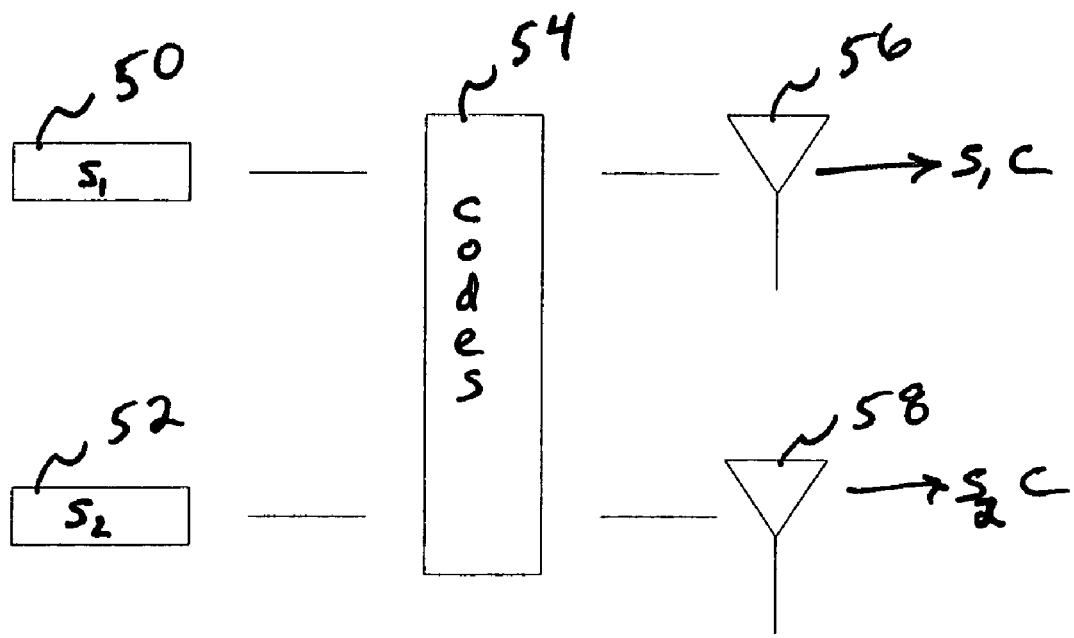

FIGS. 3A and 3B illustrate examples of PSRC and PARC methods, respectively. As shown in FIG. 3A, a stream 40 is applied with weigh values w1 and W2 from a weight unit 46 and transmitted via antennas 42 and 44. That is, the same stream is transmitted from each antenna, but is multiplied with different weight values. A next stream (not shown) is then processed in a similar manner.

As shown in FIG. 3B, in the PARC method, streams 50 and 52 are multiplied with codes from a coding unit 54 and transmitted via antennas 56 and 58. Note, the codes can be the same codes or different codes, which is discussed in more detail later.

Further, the MIMO system according to the present invention implements in one example, an error correction code (CRC) added to a plurality of packet streams transmitted through each antenna or where one CRC is transmitted through several antennas. See, for example, U.S. application Ser. No. 10/845,086 filed on May 14, 2004, which as noted above is incorporated by reference in its entirety.

Further, because there are a plurality of parallel data streams transmitted in the MIMO system, the present invention in one example applies different spreading codes, such as different OVSF spreading codes, to each control data stream corresponding to the plurality of parallel data streams. Thus, the terminal, UE, subscriber unit, etc. is able to discriminate the different control signals.

In more detail, FIG. 4 is a flow chart illustrating a method of transmitting control signals corresponding to the different data streams. As shown, the transmitting end of the MIMO system (e.g., base station) first allocates a shared control channel (HS-SCCH) for each separate data stream (steps S10 and S11).

Further, the transmitting end (base station) discriminates the respective control signals (e.g., the respective HS-SSCH) using different OVSF codes, for example (step S12). Then, the transmitting end transmits the separate control signals to the terminal through the transmission antenna (step S13). Thus, the transmitting end transmits independent parallel downlink control signals including control information about the data streams transmitted from the multiple antennas.

Figure 5:
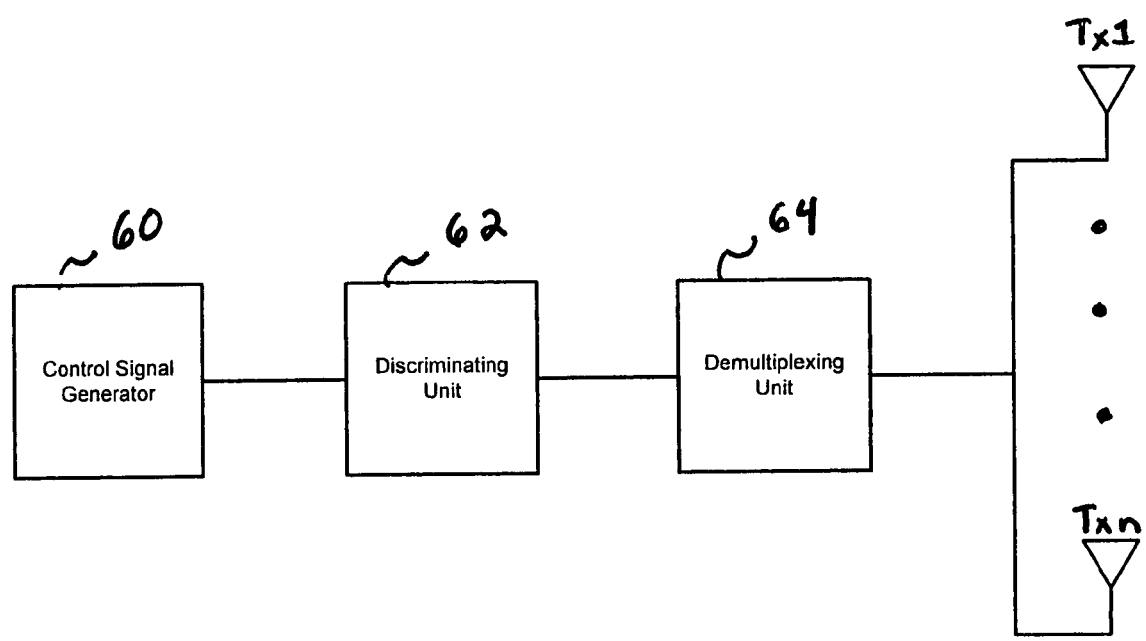
FIG. 5 is a block diagram illustrating an apparatus for generating and discriminating control signals according to the present invention.

FIG. 5 illustrates an apparatus for performing the steps shown in FIG. 4. As shown in FIG. 5, the transmitting end of the MIMO system includes a control signal generator 60 for generating/allocating the required control signals, a discriminating unit 62 for discriminating the control signals, and a demultiplexing unit 64 for distributing the discriminated control signals. Note the demultiplexing unit 64 may occur before the discriminating unit 62. The different methods of discriminating the control signals are discussed in more detail below.

Thus, according to the present invention, the base station transmits information about each transmitting antenna and discriminates each control signal (e.g., HS-SCCH) using different spreading codes such as OVSF codes. For example, a control sign corresponding to antenna #1 is discriminated using an OVSF code #1, a control signal corresponding to antenna #2 is discriminated using another OVSF code #2, etc.

Further, it is particularly advantageous that the present invention uses different OVSF codes to distinguish the control signals from each other, because this method provides backward compatibility with mobile terminals configured for HS-DPA that use a single antenna. In more detail, according to the present invention each transmitting antenna has a corresponding control signal such that parallel control signals are transmitted. This differs from a serial control signal in which information about each antenna would be transmitted in a serial control signal in different time slots, for example.

However, assume a UE1 is configured for a HS-DPA system that uses a single transmitting antenna and a UE2 is configured for a system that uses a MIMO system. In this example, the UE1 would not be able to discriminate what portion of the single serial stream is for it without changing the software of the UE1. That is, the UE1 would have to be reconfigured and would not be compatible with a HS-DPA system using a MIMO transmitter.

On the contrary, the present invention advantageously uses parallel transmitted control signals, which would allow the UE1 to be compatible with a system using a MIMO transmitter. For example, the base station can insert a UE ID into the control signal to inform UE1 the control signal is for it.

In the above example different OVSF codes are used, however, the present invention also applies a method using a code reuse to discriminate control signals (or control channels) by streams (antennas).

A more detailed explanation of the discriminating methods will now be given.

Discrimination of the different control signals using different OVSF codes, transmission diversity or weight values.

First, in the PARC method (see FIG. 3B), if the number of transmission streams to be transmitted to one terminal (UE) is 'C', the base station allocates a 'C' number of control channels (HS-SCCHs) to transmit the 'C' number of transmission streams. Further, the allocated HS-SCCHs signals for the different data streams are discriminated by respectively different OVSF codes. That is, the base station multiplies different OVSF codes to the HS-SCCHs, and then the HS-SCCHs are transmitted.

In one example, each transmitted HS-SCCH signal is transmitted from a separate transmitting antenna such that a ratio between the HS-SCCHs signals and the transmitting antennas is 1:1. If the number of the transmission antennas is greater than the number of transmission streams (i.e., M>C), the base station transmits the HS-SCCHs signals through a 'C' number of transmission antennas selected from the 'M' number of transmission antennas.

In addition, the HS-SCCHs which are discriminated by different codes may be transmitted by transmit diversity for more efficient transmission.

Further, for the PSRC method in which weight vectors are multiplied to transmission streams (see FIG. 3A), which are then distributed to several antennas, the base station multiplies different OVSF codes to the HS-SCCHs signals and then transmits the control signals.

Alternatively, the transmitting end may multiply weight vectors and the same OVSF codes to the HS-SCCHs rather than different OVSF codes and then transmit the control signals.

Further, when the control signals are discriminated using different OVSF codes, it is possible that the number of available downlink OVSF codes is insufficient. In this instance, OVSF codes of a secondary set of scrambling codes, as well as OVSF codes of a primary scrambling code set can be used.

Thus, in this first example, different OVSF codes can be used to discriminate different control signals in the PARC method. For the PSRC method, different OVSF codes or weight values may be used to discriminate different control signals.

Code Reuse Transmission.

First, in the PARC method (see FIG. 3B), to transmit the 'C' number of HS-SCCH signals, a code reuse transmission may be used to transmit the data stream. In this example, the same OVSF code is multiplied to the separate controls signals and then transmitted through each different antenna. Note this differs from the above examples in which different OVSF codes were used. The terminal then discriminates controls signals using a difference of fading channels that each stream undergoes.

In addition, because there is an interference component in the received stream due to a stream transmitted from another antenna, the terminal is able to detect the transmission stream using a successive interference cancellation (SIC) method.

In addition, if weight vectors are multiplied to the transmission stream such as in the PSRC method (see FIG. 3A), and which are then distributed to several antennas, the base station (transmitting end) multiplies the same OVSF code to the HS-SCCHs signals and transmits the signals. In an alternative example, the transmitting end may multiply the weight vectors to the HS-SCCHs signals rather than using OVSF codes and then transmit the signals. When the weight vectors are multiplied to the HS-SCCHs and then transmitted, even though the same OVSF code is used, if the weight vectors are orthogonal, the terminal can receive transmission streams without interference.

As so far described, the method for transmitting a download control signal in a mobile communication system using multiple antennas of the present invention has the following advantages.

That is, for example, by maintaining the existence of the shared control channels (HS-SCCH) rather than adding new separate control channels, a backward compatibility of previous communication systems is achieved. Further, whether data streams transmitted to each antenna is made by one packet or several packets, the present invention can be applied.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method of communication in a Multiple Input Multiple Output (MIMO) system, comprising:
    transmitting by a base station, independent parallel downlink control signals including control information for each data stream; and
    transmitting the data streams,
    wherein a modulation and coding set (MCS) is independently applied per antenna for the data streams, according to the MCS being defined for each antenna based on feedback information from a mobile terminal,
    wherein the feedback information from the mobile terminal includes channel quality information indicating channel states of each antenna,
    wherein each of the independent parallel downlink control signals includes a User Equipment identifier (UE ID),
    wherein each data stream is multiplied with different weight values,
    wherein the different weight values are used to discriminate each control signal and a Successive Interference Cancellation (SIC) method is used to remove an influence of a first data stream by the mobile terminal;
    wherein the control information corresponds to at least one from a modulation method used to modulate the data streams, a number of OVSF (Orthogonal Variable Spread Factor) codes used to spread the data streams, and a re-transmission scheme used to request retransmission of at least one of the data streams,
    wherein for the modulation method, the number of OVSF codes, and the retransmission scheme are set differently using a Per Antenna Rate Control (PARC) method,
    wherein the different OVSF codes are used to discriminate each control signal so as to provide a backward compatibility with the mobile terminal configured for a High Speed Downlink Packet Access (HSDPA) using a single antenna;
    wherein the different OVSF codes or weight values are used to discriminate each control signal by applying a Per Stream Rate Control (PSRC) method;
    wherein if a number "C" of control signals to be transmitted is less than a number "M" of multiple transmitting antennas of the MIMO system, the control signals are transmitted via a "C" number of transmitting antennas selected from the "M" number of multiple transmitting antennas, and
    wherein a number of the independent parallel downlink control signals equals a number of the data streams such that a ratio of the data streams to the independent parallel downlink control signals is 1:1.

2. The method of claim 1, wherein the control signals are transmitted on respective High-Speed Shared Control Channels (HS-SCCHs).

3. The method of claim 1, wherein each independent parallel downlink control signal is also discriminated using different spreading codes.

4. The method of claim 1, wherein each independent parallel downlink control signal is also discriminated using a transmission diversity.

5. The method of claim 1, wherein each independent parallel downlink control signal is also discriminated using code reuse transmission.

6. The method of claim 1, wherein each independent parallel downlink control signal is also discriminated using a same spreading code.

7. A Multiple Input Multiple Output (MIMO) communication system having multiple transmitting antennas, comprising:
    a discrimination unit configured to discriminate independent parallel downlink control signals including control information for each data stream transmitted by the multiple antennas,
    wherein the control signals define a modulation and coding set (MCS) that is independently applied per antenna for the data streams, according to the MCS being defined for each antenna based on feedback information from a mobile terminal,
    wherein the feedback information from the mobile terminal includes channel quality information indicating channel states of each antenna,
    wherein each of the independent parallel downlink control signals includes a User Equipment identifier (UE ID), wherein each data stream is multiplied with different weight values, wherein the different weight values are used to discriminate each control signal and a Successive Interference Cancellation (SIC) method is used to remove an influence of a first data stream by the mobile terminal;

wherein the control information corresponds to at least one from a modulation method used to modulate the data streams, a number of OVSF (Orthogonal Variable Spread Factor) codes used to spread the data streams, and a re-transmission scheme used to request retransmission of at least one of the data streams, wherein for the modulation method, the number of OVSF codes, and the retransmission scheme are set differently using a Per Antenna Rate Control (PARC) method, wherein the different OVSF codes are used to discriminate each control signal so as to provide a backward compatibility with the mobile terminal configured for a High Speed Downlink Packet Access (HSDPA) using a single antenna;

wherein the different OVSF codes or weight values are used to discriminate each control signal by applying a Per Stream Rate Control (PSRC) method;

wherein if a number "C" of control signals to be transmitted is less than a number "M" of multiple transmitting antennas, the control signals are transmitted via a "C" number of transmitting antennas selected from the "M" number of multiple transmitting antennas, and wherein a number of the independent parallel downlink control signals equals a number of the data streams such that a ratio of the data streams to the independent parallel downlink control signals is 1:1.

8. The system of claim 7, wherein the control signals are transmitted on respective High-Speed Shared Control Channels (HS-SCCHs).

9. The system of claim 7, wherein the discriminating unit also discriminates each control signal using different spreading codes.

10. The system of claim 7, wherein each control signal is also transmitted using transmission diversity.

11. The system of claim 7, wherein the discriminating unit also discriminates each control signal using code reuse transmission.

12. The system of claim 7, wherein the discriminating unit discriminates each control signal using a separate weight vector.

13. The system of claim 7, wherein the discriminating unit also discriminates each control signal using a same spreading code.

14. A transmitter for a multiple antenna radio communication system, comprising:

a plurality of transmit antennas; and a plurality of processing units cooperating with the transmit antennas to independently apply a modulation and coding set (MCS) per transmit antenna for the data streams, according to the MCS being defined for each transmit antenna based on feedback information received from a receiver, and to transmit control signals for the data streams to inform the receiver about control information included in the control signals that is used in the transmitter, wherein the feedback information from the receiver includes channel quality information indicating channel states of each antenna, wherein each of the control signals includes a User Equipment identifier (UE ID), wherein each data stream is multiplied with different weight values, wherein the different weight values are used to discriminate each control signal and a Successive Interference Cancellation (SIC) method is used to remove an influence of a first data stream by the mobile terminal;

wherein the control information corresponds to at least one from a modulation method used to modulate the data streams, a number of OVSF (Orthogonal Variable Spread Factor) codes used to spread the data streams, and a re-transmission scheme used to request retransmission of at least one of the data streams, wherein for the modulation method, the number of OVSF codes, and the retransmission scheme are set differently using a Per Antenna Rate Control (PARC) method, wherein the different OVSF codes are used to discriminate each control signal so as to provide a backward compatibility with the mobile terminal configured for a High Speed Downlink Packet Access (HSDPA) using a single antenna;

wherein the different OVSF codes or weight values are used to discriminate each control signal by applying a Per Stream Rate Control (PSRC) method;

wherein if a number "C" of control signals to be transmitted is less than a number "M" of multiple transmitting antennas, the control signals are transmitted via a "C" number of transmitting antennas selected from the "M" number of multiple transmitting antennas, and wherein a number of the independent parallel downlink control signals equals a number of the data streams such that a ratio of the data streams to the independent parallel downlink control signals is 1:1.

15. A receiver for a multiple antenna radio communication system, comprising:

at least one receive antenna; and a plurality of processing units cooperating with the at least one receive antenna to send feedback information to a transmitter and to receive data streams from the transmitter that independently applied a modulation and coding set (MCS) per transmit antenna for the data streams, according to the MCS being defined for each transmit antenna based on the feedback information sent to the transmitter, and to receive control signals for the data streams to be informed about control information included in the control signals that is used in the transmitter, wherein the feedback information includes channel quality information indicating channel states of each antenna, wherein each of the control signals includes a User Equipment identifier (UE ID), wherein each data stream is multiplied with different weight values, wherein the different weight values are used to discriminate each control signal and a Successive Interference Cancellation (SIC) method is used to remove an influence of a first data stream by the mobile terminal;

wherein the control information corresponds to at least one from a modulation method used to modulate the data streams, a number of OVSF (Orthogonal Variable Spread Factor) codes used to spread the data streams, and a re-transmission scheme used to request retransmission of at least one of the data streams, wherein for the modulation method, the number of OVSF codes, and the retransmission scheme are set differently using a Per Antenna Rate Control (PARC) method, wherein the different OVSF codes are used to discriminate each control signal so as to provide a backward compatibility with the mobile terminal configured for a High Speed Downlink Packet Access (HSDPA) using a single antenna;

wherein the different OVSF codes or weight values are used to discriminate each control signal by applying a Per Stream Rate Control (PSRC) method;

wherein if a number "C" of control signals to be transmitted is less than a number "M" of multiple transmitting antennas, the control signals are transmitted via a "C" number of transmitting antennas selected from the "M" number of multiple transmitting antennas, and wherein a number of the independent parallel downlink control signals equals a number of the data streams such that a ratio of the data streams to the independent parallel downlink control signals is 1:1.

* * * * *